United States Patent [19]

Jarboe

[11] Patent Number: 5,074,584

[45] Date of Patent: Dec. 24, 1991

[54] AIR BAG FASTENER

[75] Inventor: Patrick G. Jarboe, Rochester, Mich.

[73] Assignee: TRW Vehicle Safety Systems Inc., Cleveland, Ohio

[21] Appl. No.: 541,280

[22] Filed: Jun. 20, 1990

[51] Int. Cl.⁵ .............................................. B60R 21/20
[52] U.S. Cl. ...................................... 280/743; 280/731; 280/732
[58] Field of Search ............... 280/728, 731, 732, 743; 24/458

[56] References Cited

U.S. PATENT DOCUMENTS

| | | | |
|---|---|---|---|
| 1,270,341 | 6/1918 | Spreen | 24/690 |
| 1,509,002 | 9/1924 | Soule | 24/580 |
| 2,651,614 | 9/1953 | Bungay | 204/297 W |
| 2,834,606 | 5/1958 | Bertrand | 280/730 |
| 2,845,671 | 8/1958 | Fisher et al. | 24/458 |
| 3,426,400 | 2/1969 | Lauro | 24/601.7 |
| 3,604,073 | 9/1971 | Green | 24/265 C |
| 3,642,303 | 2/1972 | Irish et al. | 280/730 |
| 3,774,936 | 11/1973 | Barnett et al. | 280/730 |
| 3,778,085 | 12/1973 | Lipkin | 280/734 |
| 4,111,457 | 9/1978 | Kob et al. | 280/728 |
| 4,310,110 | 1/1982 | Dexter | 224/246 |
| 4,752,083 | 6/1988 | Honda | 280/731 |
| 4,941,678 | 7/1990 | Lauritzen et al. | 280/732 |

Primary Examiner—Kenneth R. Rice
Attorney, Agent, or Firm—Calfee, Halter & Griswold

[57] ABSTRACT

A vehicle air bag module includes a reaction device, an air bag and a fastener structure adapted to secure the air bag to the reaction device. The reaction device includes pairs of openings with retainer portions intermediate the openings. The air bag includes a mouth portion defining a gas inlet opening. The fastener structure includes a plurality of hook-like fasteners integrally formed with a flexible strip. The flexible strip is interconnected with the mouth portion of the air bag such that the fasteners are adapted to engage the openings in the reaction device, and thereby to couple the air bag with the reaction device.

11 Claims, 4 Drawing Sheets

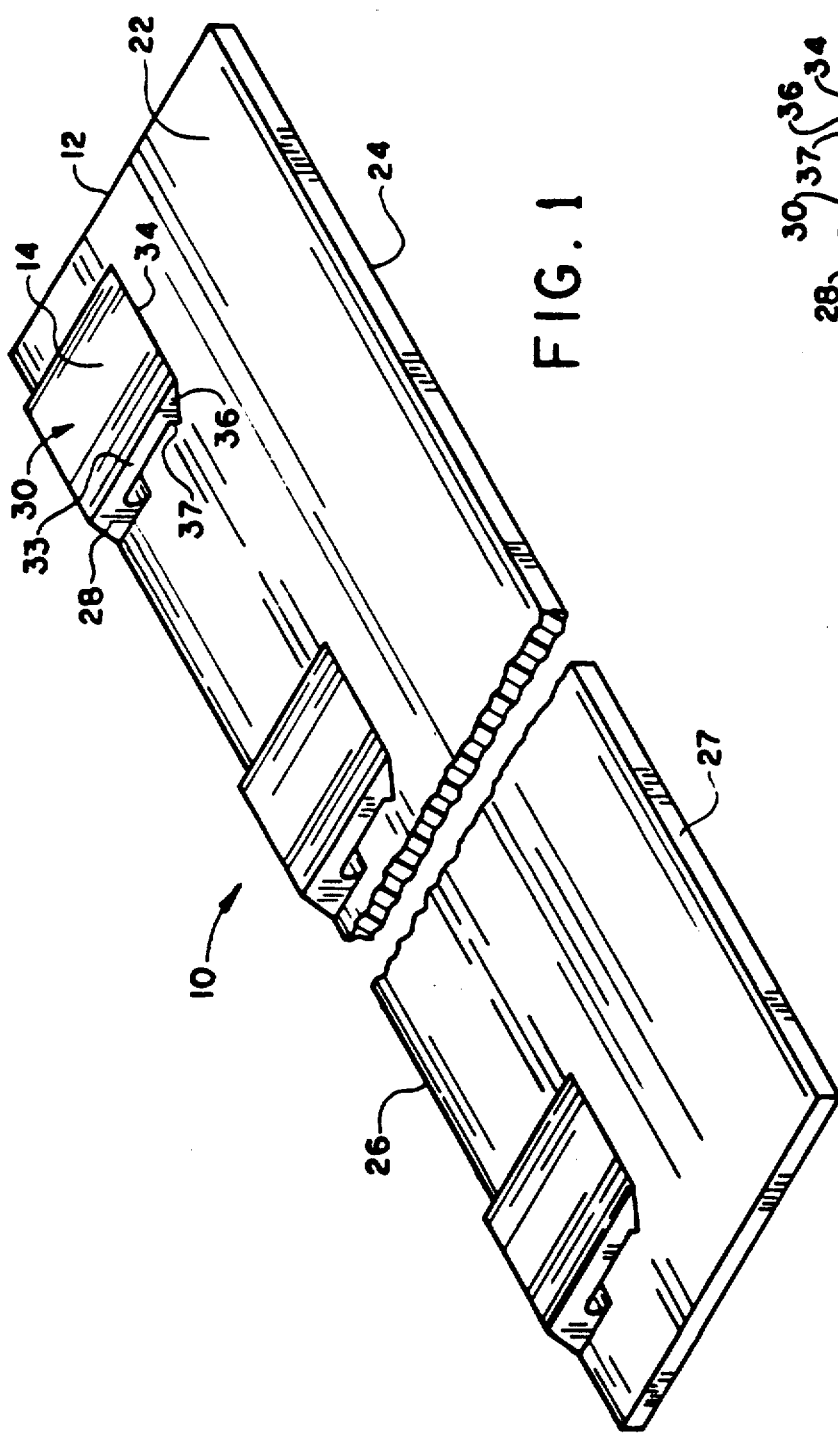
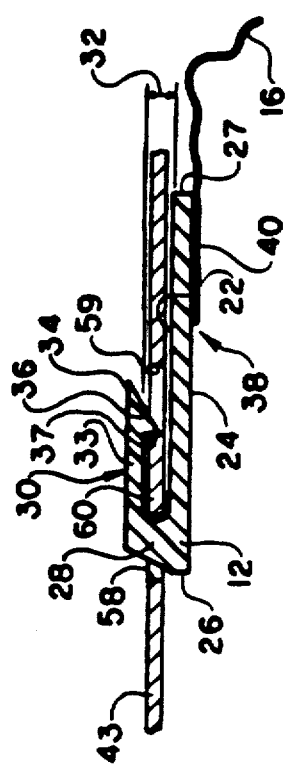

AIR BAG FASTENER

TECHNICAL FIELD

The present invention relates to an air bag module with a new and useful fastener structure for securing an air bag to the module. It relates specifically to a fastener structure which (i) is efficiently and inexpensively formed, (ii) readily attached to an air bag, and (iii) designed to enable the air bag to be simply and securely attached to a vehicle air bag module.

BACKGROUND

A vehicle air bag system typically comprises an air bag module which is secured to a structural part of the vehicle. The module generally comprises (i) a container for a folded air bag, and (ii) a gas generator (also known as in inflator) disposed either partially or wholly within the container, and adapted to generate gases to deploy the air bag at the onset of a collision. Generally, the container comprises a reaction device adapted to be connected to the folded air bag and to a structural part of the vehicle, and a cover attached to the reaction device. In certain air bag module constructions, the reaction device comprises a can, and both the inflator and the folded air bag are disposed within a cavity formed in the can. In other types of air bag module constructions, the reaction device comprises a plate-like member. The cover and the reaction member in such constructions cooperate to define the air bag cavity, and the inflator is disposed at least partially within the cavity formed by the plate and cover.

Regardless of the specific construction of the module, it is important to attach the air bag efficiently and securely to the reaction device. At the onset of a collision, when the inflator is ignited, gases are generated under relatively high pressures. Those gases are directed rapidly into the air bag to inflate the air bag within milliseconds of the onset of the collision. As the air bag is being inflated, significant forces are applied between the air bag and the reaction device. The fasteners between the air bag and the reaction device must be strong enough to withstand such forces, without allowing the air bag to become torn away from the reaction device during inflation.

Over the years, different ways for fastening air bags to reaction devices have been suggested. One well known technique is by means of bolts which extend through aligned openings in the air bag and the reaction device. Further, retainer bars can be bolted to the reaction device, with the air bag captured between the bars so that pressures along the air bag fabric are not localized. Examples of this construction are shown in U.S. Pat. No. 4,842,300.

Another way of securing an air bag to a reaction device is by means of specially formed plastic strip connected to the air bag and inserted into a clamp on the reaction device. An example of such a structure is shown in U.S. Pat. No. 4,111,457.

Still another way of connecting an air bag to a reaction device is by means of a specially constructed flange on the reaction device. The flange is adapted to clamp part of the air bag against another part of the reaction device. An example of such a device is shown in U.S. Pat. No. 3,778,085.

Still further examples of ways of securing an air bag to a reaction device comprise securing the air bag directly to a diffuser by means of a bracket and sheet metal screws (see e.g., U.S. Pat. No. 3,774,936) and special clamp and clamp bolts for securing an air bag to an outside of a manifold (see e.g., U.S. Pat. No. 3,642,303).

Finally, yet another way of connecting an air bag to a reaction device is by means of retainer rings and flanged nipples. An example of such a structure is shown in U.S. Pat. No. 2,834,606.

In the air bag art, there are continuing needs for new and useful fastening devices for attaching an air bag to a reaction device. Applicant believes such devices should be relatively simple and inexpensive to construct and simple to attach to air bags. Moreover, when the reaction device comprises a reaction can, applicant believes such a fastening device should enable the air bag to be connected to the inside of the reaction can. By attaching the air bag to the inside of the reaction can, the overall package size of the module is minimized and space is conserved. Conservation of space is becoming increasingly important in the air bag art, as the space allocated within the vehicle compartment for air bag modules decreases. Such decreases are due to overall reductions in automotive vehicle size, and to the limited space available in compact-sized vehicles.

SUMMARY OF THE PRESENT INVENTION

The present invention relates to a new and useful fastening device for connecting an air bag to a reaction device. The fastening device is relatively simple and inexpensive to construct and to attach to an air bag by mass production techniques. Moreover, when attached to an air bag, the fastening device is relatively simple to use to connect the air bag to a reaction device. When the reaction device comprises a reaction can, the fastening device is particularly useful because it enables the air bag to be attached from the inside of the can, thereby to minimize the overall package size of the module.

According to the preferred embodiment of the present invention, the fastening device comprises a flexible strip connected to and surrounding the gas inlet opening in an air bag. The flexible strip has a series of integral fasteners for fastening the air bag to the reaction device. The flexible strip may be sewn or otherwise connected to the air bag material.

Each of the fasteners is hook-shaped. Each hook-shaped fastener is integrally connected with the flexible strip, and has a hook-shaped distal end spaced from the flexible strip. The hook-shaped distal end of the fastener has an integral barb.

The reaction device comprises a wall with pairs of spaced apart holes extending therethrough and a retainer portion of the wall disposed between each pair of holes. Each hook-shaped fastener is adapted to be inserted through one of each pair of spaced apart holes and hooked about the respective retainer portion of the wall of the reaction device. When the reaction device is a reaction can, the pairs of spaced apart holes are formed in a wall of the reaction can defining an access opening. The hook-shaped fasteners can hook about a respective retainer portion of the wall of the reaction can from the inside of the reaction can, to attach the air bag to the reaction can. The barbs at the distal ends of the fasteners enable the fasteners securely to engage the retainer portions of the reaction can, thereby to engage the air bag securely with the reaction can. The fasteners are designed to maintain the air bag connected with the reaction can under the pressures developed during deployment of the air bag.

The flexible strip is manufactured of a plastic material or other resilient material. Thus, the flexible strip can be readily conformed to the shape of the reaction can, to enable the fasteners to be easily and securely engaged with the reaction can.

Further objects and features of the present invention will become apparent from the following detailed description and the accompanying drawings.

BRIEF DESCRIPTION OF DRAWINGS

FIG. 1 is a perspective fragmentary illustration of a fastening device according to the present invention;

FIG. 2 is a sectional illustration of the fastening device attached to an air bag and engaged with a reaction device according to the present invention;

DETAILED DESCRIPTION OF THE PREFERRED EMBODIMENT

Figure 3A:
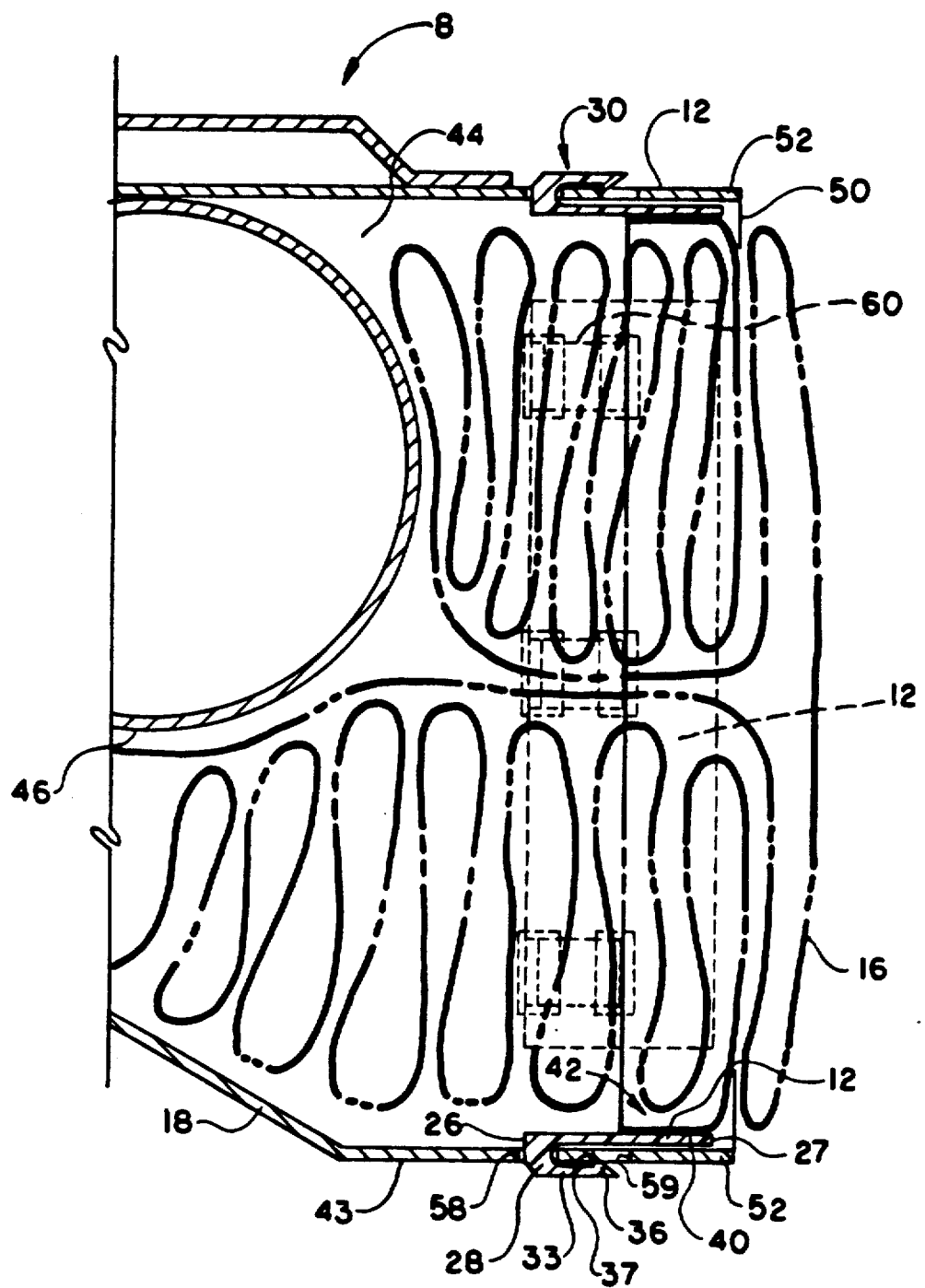
FIG. 3A is a fragmentary sectional illustration of an air bag module with a fastening device according to the invention securing an air bag to a reaction device.

As described above, the present invention relates to an air bag module with a fastening device for connecting an air bag to a reaction device. The air bag module 8 comprises a reaction device 18 having a cavity for a gas generator 46 and a folded air bag 16 (see FIG. 3A). The gas generator 46 is actuated at the onset of an emergency or collision and generates non-toxic inert gas, under pressure, in the cavity. The gas forces the air bag 16 through an opening 50 in the reaction device 18 to deploy the air bag 16. The fastening device 10 is constructed according to the principles of the present invention, and functions to secure the air bag to the reaction device 18.

The fastening device 10 of the present invention comprises a flexible strip 12 and a plurality of hook-shaped fasteners 14 integrally connected and preferably formed in one piece with the flexible strip 12. The strip 12 is of a substantially rectangular configuration, and includes a reaction device surface 22, an air bag surface 24, an inner edge 26 and an outer edge 27. The surfaces 22, 24 are parallel to each other. The hook-shaped fasteners 14 extend outwardly from the reaction device surface 22 adjacent the inner edge 26 of the strip.

The hook-shaped fasteners 14 fasten the air bag 16 to the reaction device or container 18, as illustrated in FIG. 2. Each of the hook-shaped fasteners 14 includes a base portion 28 and a hook portion 30. The base portion 28 of each hook-shaped fastener 14 is formed in one piece with the strip 12, and extends outwardly from the reaction device surface 22 of the strip 12. The hook portion 30 extends from the distal end of base portion 28 spaced from the reaction device surface 22 at a distance generally referred to at 32, and in the direction of the outer edge 27 of the strip 12. Each hook portion 30 includes a shaft portion 33 having a distal end 34 on which a barb 36 is formed. The barb 36 extends toward the reaction device surface 22 and includes a retainer portion surface 37 for engagement with the reaction device 18.

As additionally illustrated in FIG. 2, the flexible strip 12 is attached to the inside of the mouth portion 40 of the air bag 16 adjacent the inlet opening 42. The flexible strip 12 is preferably made of a tough, flexible material, such as plastic or other flexible material, and may be sewn or otherwise joined integrally to the air bag material at the location generally referred to at 38. A tough, flexible plastic material is preferred to enable the strip to conform to the shape of the mouth portion 40 of the air bag 16, and to the shape of the reaction device 18. Additionally, manufacturing the fastening device 10 of a tough, flexible plastic material enables the strip 12 to be readily flexed to a desired configuration, and the fasteners 14 to be easily and securely engaged with the reaction device, as in FIGS. 2-4.

Figure 3B:
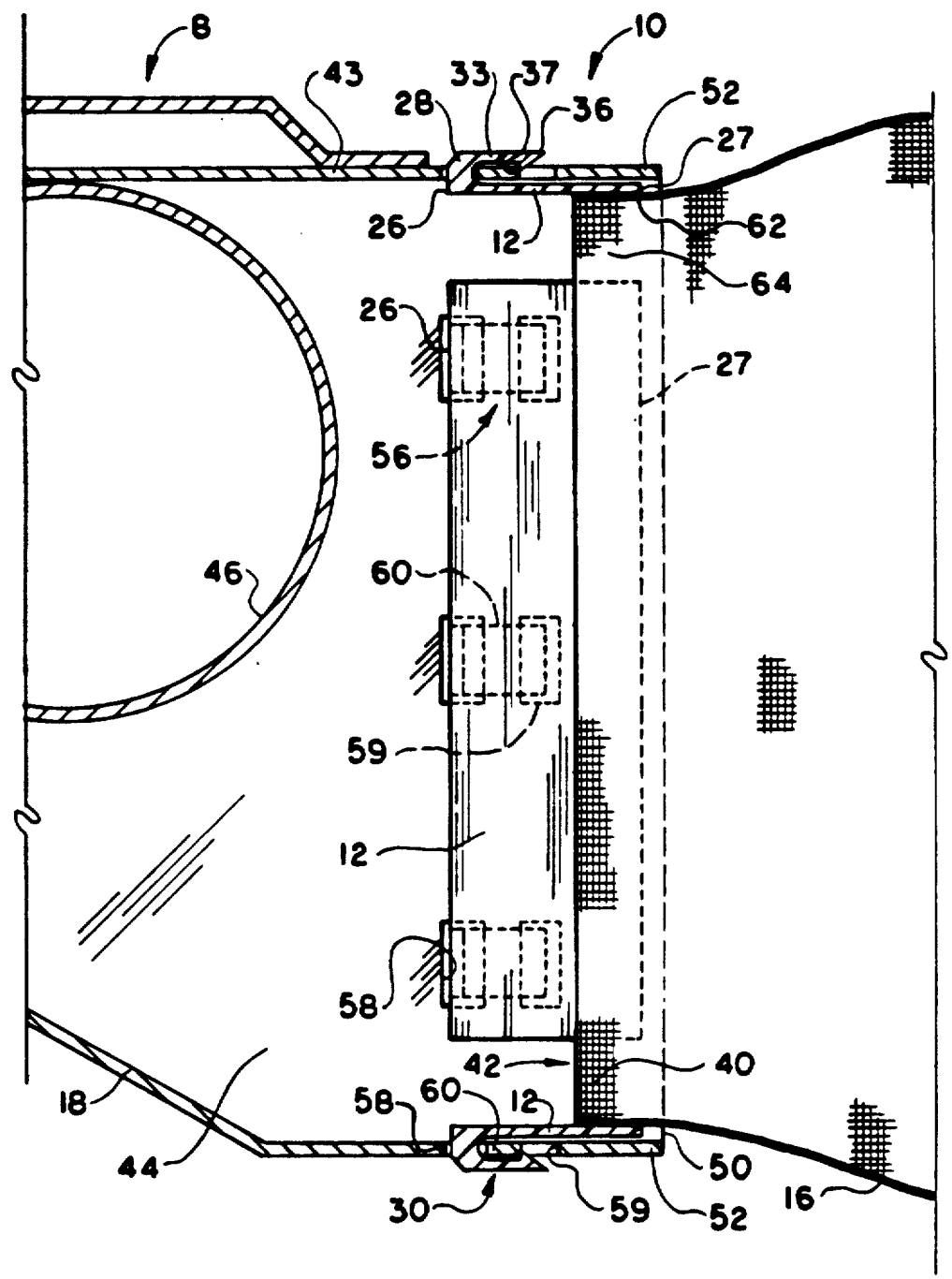
FIG. 3B is a fragmentary sectional illustration of an air bag module with the air bag deployed, and with a fastening device according to the invention securing the air bag to a reaction device.
Figure 4:
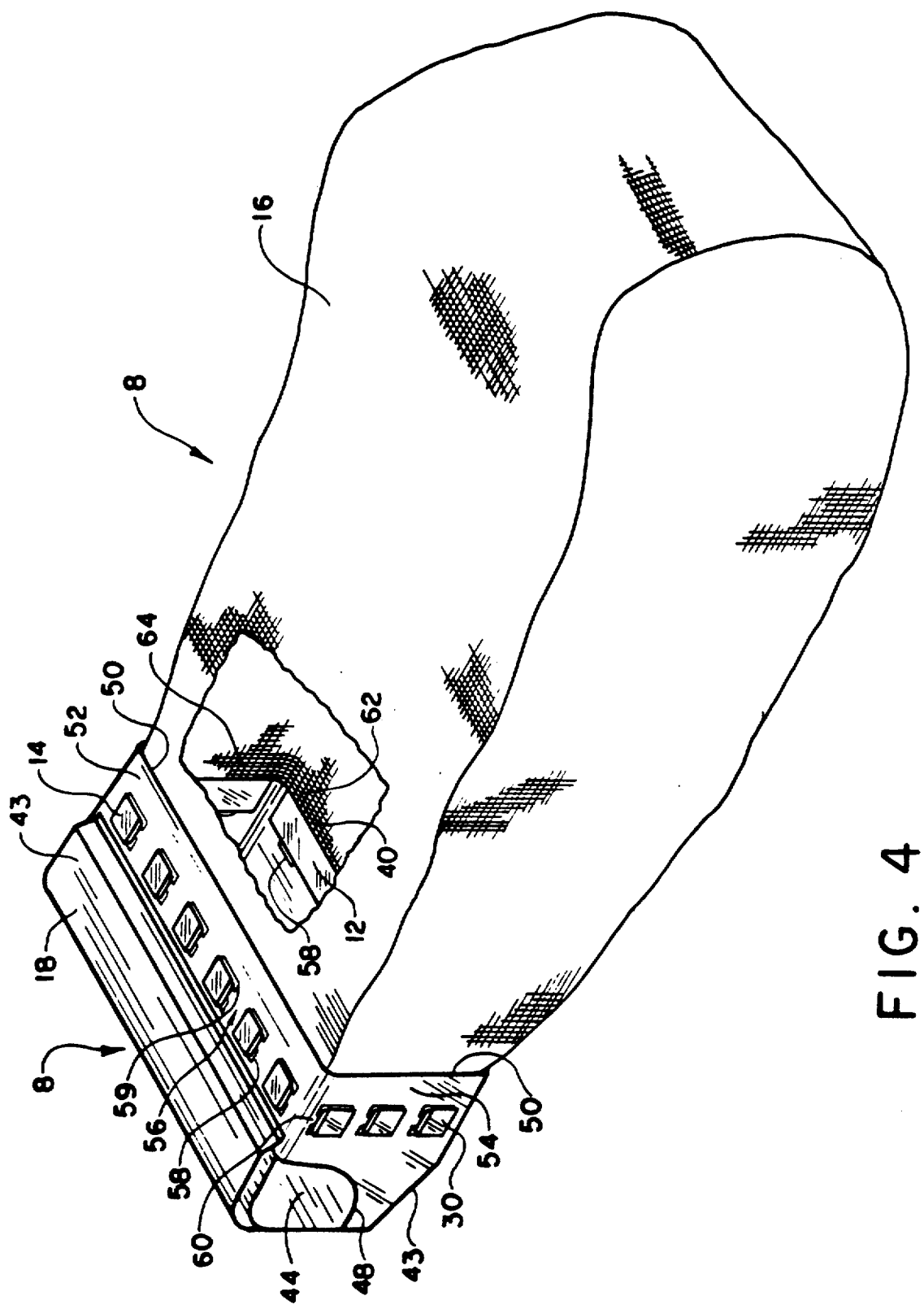
FIG. 4 is a perspective illustration of an air bag module according to the invention, with the air bag deployed and a portion of the air bag cut-away to illustrate the fastener device and air bag attached on the inside of the reaction device.

The reaction device 18 is in part illustrated in FIGS. 2, 3A and 3B, and more fully illustrated in FIG. 4. The reaction device 18 is preferably made of sheet steel components. Walls 43 of the reaction device 18 define a cavity 44 for receiving a cylindrical gas generator (shown schematically at 46 in FIGS. 3A and 3B) and the vehicle air bag 16. The walls 43 also define a side opening 48, as in FIG. 4, for enabling insertion of the cylindrical gas generator 46 into the reaction device 18. Additionally, the walls 43 define a front or access opening 50 for enabling at least part of the air bag 16 to be inserted into the cavity 44 of the reaction device 18, as shown in FIG. 3A. The front opening 50 is preferably rectangular, being defined by parallel major side portions 52 and parallel minor side portions 54 of walls 43. Thus, the reaction device 18 encloses the gas generator 46 and at least part of the air bag 16, and stores those components until an emergency condition occurs.

As more specifically shown in FIGS. 2, 3A and 3B, the wall 43 of reaction device 18 includes pairs 56 of spaced apart holes 58, 59 extending through the wall, and a retainer portion 60 of the wall 43 is disposed between each pair of holes 58, 59. When the reaction device 18 is a reaction can or container, the pairs 56 of the spaced apart holes 58, 59 are formed in the portions of the planar walls 43 of the reaction can defining the front or access opening 50. The holes are positioned adjacent the access opening 50, such that one of the holes 59 of each pair 56 is intermediate the other hole 58 and the access opening.

Each hook-shaped fastener 14 is adapted to be hooked about its respective retainer portion 60. Specifically, the hook shaped portion 30 is spaced from the strip 12 at a distance 32, which is slightly greater than the thickness of the wall 43 and retainer portion 60, as illustrated in FIG. 2. Additionally, the distance between the base portion 28 and the barb retainer portion surface 37 of the hook portion 30, is slightly greater than the width of the retainer portion 60. With this configuration the barb 36 and base portion 28 of the fastener 14 are hooked about the retainer portion 60, thereby to retain the fastener device 10 and air bag 16 connected with the reaction can 18.

In the first step in assembling an air bag module 8 with the fastener device 10 of the present invention, the flexible strip 12 is sewn or otherwise connected with the mouth portion 40 of the air bag 16. As illustrated in the preferred embodiment of FIG. 4, the mouth portion 40 of the air bag 16 has a rectangular shape with parallel major sides 62 and parallel minor sides 64. Strips 12 corresponding in length to the major and minor sides of the air bag are engaged with the air bag on air bag surfaces 24, and sewn inside the mouth portion 40 of the air bag positioned for engagement with the parallel major and minor side portions 52, 54 of the walls 43 of the reaction can 18. In the illustrated embodiment, four strips are sewn to the air bag. Alternatively, a single strip 12 (not illustrated) may be used surrounding the gas inlet opening 42.

In the next assembly step, the strips 12 and integrally connected air bag 16 are inserted into the cavity 44 of the reaction can 18 adjacent the front opening 50. The strips 12 on the major and minor sides 62, 64 of the air bag 16 are aligned with the corresponding major and minor side portions 52, 54 of the reaction can 18. In this position, the integral fasteners 14 of the strips 12 may then be engaged with the reaction can 18. Thus, the fastener device 10 of the present invention is believed to minimize the overall package size of the vehicle air bag module 8 by enabling attachment of the fasteners 14 and interconnected air bag 16 to the inside of the reaction can 18.

To engage the fasteners 14 with the reaction can 18, each strip 12 is flexed sufficiently that the distal end 34 of the hook portion 30 of each fastener 14 engages a hole 58. Once the distal end 34 of each fastener 14 is engaged with a hole 58, the strip 12 may be returned to its planar configuration and moved in the direction of its outer edge 27, away from the cavity 44. The strip is moved until the barb 36 on the distal end 34 of each hook portion 30 is moved past its respective retainer portion 60, and engaged in the corresponding second hole 59. In this position, the base portion 28 and retainer portion surface 37 of the barb 36 are engaged with opposite edges of the retainer portion 60, and the reaction device surface 22 of the strip is positioned adjacent the reaction can, to hook the fastener 14 about the retainer portion and thereby resist accidental removal of the fastener device 10 and interconnected air bag 16 under the pressure of gas generated during deployment of the air bag.

To complete assembly of the air bag module 8, the air bag 16 is next folded into the cavity 44 within the reaction can 18, or folded outside the reaction can 18 and inserted into the cavity in a folded condition. A cover (not illustrated) may then be attached to the reaction can 18 to close the air bag 16 within the cavity 44 of the reaction can. The fastening device 10 of the present invention enables the air bag 16 to be folded after the air bag is attached to the reaction can 18, and enables the air bag to remain connected to the reaction can during folding, and under the pressures developed during deployment of the air bag.

In an emergency vehicle condition or collision, the gas generator 46 is activated, and an inert gas (e.g., nitrogen) is rapidly directed, under pressure, through the gas inlet opening, as indicated by the arrows in FIG. 3B, and into the air bag 16. The pressures generated behind the air bag during gas generator activation may be as high as approximately 30-50 psi. The generated gas directed to the air bag 16 causes the air bag to be forced out of the cavity 44 through the front opening 50 of the reaction can, and causes pressure to be applied to the cover (not illustrated), which closes the air bag within the reaction can 18. The pressure of the air bag against the cover allows the cover to be separated or disconnected by any of a number of conventional methods which are well known to those of skill in the art.

The methods for separating the cover form no part of the present invention, and thus require no further discussion. Once the cover is separated, the air bag is deployed into the vehicle passenger compartment.

During deployment of the air bag, the base portion 28 of each fastener engages the retainer portion 60 of the reaction device 18 such that the fastener remains hooked about the retainer portion, and the flexible strip 12 remains engaged with the reaction can. Moreover, as the flexible strip 12 is disposed primarily on the inside of the reaction can, gas forces act on the inner edge 26 of the strip during inflation, as gas is directed to the air bag, to help prevent accidental dislodgement of the strip 12 and its fasteners 14 from the reaction can. Thus, in the event of an emergency requiring inflation of the air bag, the fastening device 10 of the present invention provides an efficient attachment between the air bag 16 and reaction can 18. Additionally, the fastening device is simple and inexpensive to construct, and simple to attach to the air bag 16 and reaction can 18.

While the foregoing disclosure depicts the preferred embodiment, there are other ways contemplated for providing the features and advantages of the present invention. For example, the reaction device of the preferred embodiment is a reaction can which houses the entire gas generator and air bag. Other forms of reaction devices are well known in the prior art, and it is contemplated that the present invention may be used in connection with such devices. It will be apparent from the foregoing that additional changes may be made in the details of construction and configuration by one of ordinary skill in this art without departing from the scope and spirit of the invention as defined in the following claims.

I claim:

1. An air bag module comprising a container defining an air bag cavity and a folded air bag disposed in the air bag cavity, said container being at least partially defined by a reaction device and said air bag being connected with said reaction device;
   said air bag having first fastening structure integrally connected with said air bag and having a portion extending away from said air bag, a substantial portion of said first fastening structure being disposed on the inside of said container;
   said reaction device having second fastening structure integral with said reaction device; and
   said portion of said first fastening structure extending away from said air bag directly engaging said second fastening structure to couple said air bag to said reaction device.

2. An air bag module as defined in claim 1 wherein said first fastening structure comprises a substantially continuous ring, and said substantially continuous ring is secured to said air bag.

3. An air bag module comprising a container defining an air bag cavity and a folded air bag disposed in the air bag cavity, said container being at least partially defined by a reaction device and said air bag being connected with said reaction device;
   said air bag having first fastening means integrally connected therewith;
   said reaction device having a second fastening means integrally connected therewith;
   said first fastening means directly engaging said second fastening means to couple said air bag to said reaction device;

said first fastening means comprising a hook-shaped fastener; and said second fastening means comprising a pair of openings in said reaction device with a retainer portion of said reaction device therebetween so that said hook-shaped fastener may be inserted at least partially through said openings and hooked about said retainer portion to enable said hook-shaped fastener to engage said second fastening means.

4. Apparatus as set forth in claim 3, wherein said hook-shaped fastener is formed integrally with a flexible strip, and said flexible strip is secured to said air bag.

5. An air bag module comprising a container defining an air bag cavity and a folded air bag disposed in the air bag cavity, said container being at least partially defined by a reaction device and said air bag being connected with said reaction device;

said air bag having first fastening means integrally connected therewith;

said reaction device having a second fastening means integrally connected therewith;

said first fastening means directly engaging said second fastening means to couple said air bag to said reaction device;

said first fastening means comprising a substantially flexible strip having a hook-shaped fastener integral therewith;

said flexible strip having parallel major surfaces; and said hook-shaped fastener comprising a base integral with and extending away from said flexible strip in a direction substantially perpendicular to one of the major side surfaces of said flexible strip, a shaft portion extending away from a distal end of said base and being substantially parallel to said flexible strip, and a barb extending away from a distal end of said shaft portion in a direction substantially toward said one of said major side surfaces of said flexible strip.

6. Apparatus as set forth in claim 5, wherein said reaction device includes a wall having a pair of openings extending therethrough and a retainer portion of said wall disposed between said pair of openings, one of said openings being dimensioned to permit insertion of said hook-shaped fastener therethrough so that said hook-shaped fastener can be hooked about said retainer portion of said wall, said barb at the distal end of said shaft portion being disposed in the other of said pair of openings in said wall when said hook-shaped fastener is hooked about said retainer portion of said wall.

7. Apparatus as set forth in any of claims 4, 5 and 6 wherein said flexible strip is disposed on the inside of said container when said first fastening means is engaged with said second fastening means.

8. Apparatus comprising an air bag module including a reaction device and an air bag adapted to be secured to said reaction device;

said reaction device comprising a wall with pairs of openings extending therethrough and retainer portions of said wall being disposed between each pair of openings;

said air bag having a mouth portion defining a gas inlet opening, and a plurality of hook-shaped fasteners integrally connected with said mouth portion, each of said fasteners being adapted to be inserted through at least one of a pair of openings and hooked about a respective retainer portion of said wall to couple the air bag with the reaction device.

9. Apparatus of claim 8, wherein said air bag comprises a fabric bag having an inner surface and an outer surface, said fasteners being formed integrally with a flexible strip, said flexible strip being secured to an outer surface of said fabric bag with said hook-shaped fasteners extending away from said outer surface of said fabric bag.

10. Apparatus comprising an air bag adapted to be attached to a reaction device, said air bag comprising an inflatable fabric bag having an inner surface and an outer surface, said fabric bag having mouth defining a gas inlet opening, said fabric bag having fasteners integrally connected therewith in proximity to said mouth, said fasteners extending outward from the outer surface of said fabric bag; said fasteners being adapted to engage a portion of the reaction device to attach the air bag to the reaction device;

said fasteners being formed integrally with a flexible strip, and said flexible strip is secured to an outer surface of said mouth with said fasteners extending in a direction away from the outer surface of said fabric bag;

said flexible strip having parallel major side surfaces, and each of said fasteners comprises a hook-shaped member integral with said flexible strip; and each hook-shaped member comprising a base integral with and extending away from said flexible strip in a direction perpendicular to one of said major side surfaces of said flexible strip, a shaft portion extending away from a distal end of said base and being substantially parallel to said strip, and a barb extending away from a distal end of said shaft portion in a direction substantially toward said one of said major side surfaces of said flexible strip.

11. Apparatus comprising an air bag adapted to be attached to a reaction device, said air bag comprising an inflatable air bag having an inner surface and an outer surface, said air bag having a mouth defining a gas inlet opening, said air bag having fastening structure integrally connected therewith in proximity to said mouth, said fastening structure having a coupling portion extending outward from the outer surface of said air bag, and said coupling portion of said fastening structure being adapted to engage a portion of the reaction device to attach the air bag to the reaction device, said fastening structure being formed integrally with a substantially continuous strip of material, and said substantially continuous strip of material being secured to an outer surface of said mouth of said air bag with said coupling portion of said fastening structure extending away from said substantially continuous strip of material.

* * * * *